United States Patent [19]

Kwiatkowski et al.

[11] Patent Number: 4,541,300

[45] Date of Patent: Sep. 17, 1985

[54] MANUALLY OPERABLE GEARSHIFT MECHANISM

[75] Inventors: Keith A. Kwiatkowski, Walled Lake; John E. Fernandez, Troy; William J. LaRocca, Warren, all of Mich.

[73] Assignee: Gulf & Western Manufacturing Company, Southfield, Mich.

[21] Appl. No.: 479,575

[22] Filed: Mar. 28, 1983

[51] Int. Cl.[4] .................... F16H 57/06; G05G 9/12
[52] U.S. Cl. ..................................... 74/476; 74/473 R
[58] Field of Search ............... 74/473 R, 476, 471 XY

[56] References Cited

U.S. PATENT DOCUMENTS

| | | | |
|---|---|---|---|
| 1,446,825 | 2/1923 | Brown . | |
| 1,449,269 | 3/1923 | Cronk . | |
| 2,269,970 | 1/1942 | Bundy et al. | 74/484 |
| 2,865,220 | 12/1958 | Bayley | 74/471 |
| 3,157,059 | 11/1964 | Hurst et al. | 74/473 |
| 3,177,737 | 4/1965 | Williams et al. | 74/471 |
| 3,648,536 | 3/1972 | Maira | 74/476 |
| 4,143,560 | 3/1979 | Kinkode et al. | 74/473 |
| 4,245,521 | 1/1981 | Osborn | 74/476 |
| 4,328,712 | 5/1982 | Osborn | 74/476 |
| 4,343,202 | 8/1982 | Osborn | 74/476 |

FOREIGN PATENT DOCUMENTS

| | | | |
|---|---|---|---|
| 57-157320 | 9/1982 | Japan | 74/473 R |
| 58-37722 | 3/1983 | Japan | 74/473 R |

Primary Examiner—Allan D. Herrmann
Attorney, Agent, or Firm—Body, Vickers & Daniels

[57] ABSTRACT

An improved manually operable gearshift mechanism is disclosed for an automobile transmission, and which gearshift mechanism is of the character including a support of sheet metal construction and first and second gear selector members mounted on the support for pivotal movement of the members together about a first axis and for pivotal movement of one of the members relative to the other about a second axis transverse to the first axis. An operating lever is attached to the second gear selector member to facilitate pivoting the first and second members about the first and second axes and between a plurality of positions relative to the support and each other and in which positions the gear selector members operate to position corresponding gear shifting cables in positions corresponding to one of a plurality of selectable transmission gears. Improvements are provided with respect to the structure of the support, mechanical interconnections by which pivotal movement of one of the gear selector members is translated to linear displacement of the corresponding gearshifting cable, stability of the gear selector members during pivotal movements thereof, and lockout mechanisms for preventing unintentional displacement of the gear selector members into the positions thereof corresponding to the reverse gear of the transmission.

65 Claims, 18 Drawing Figures

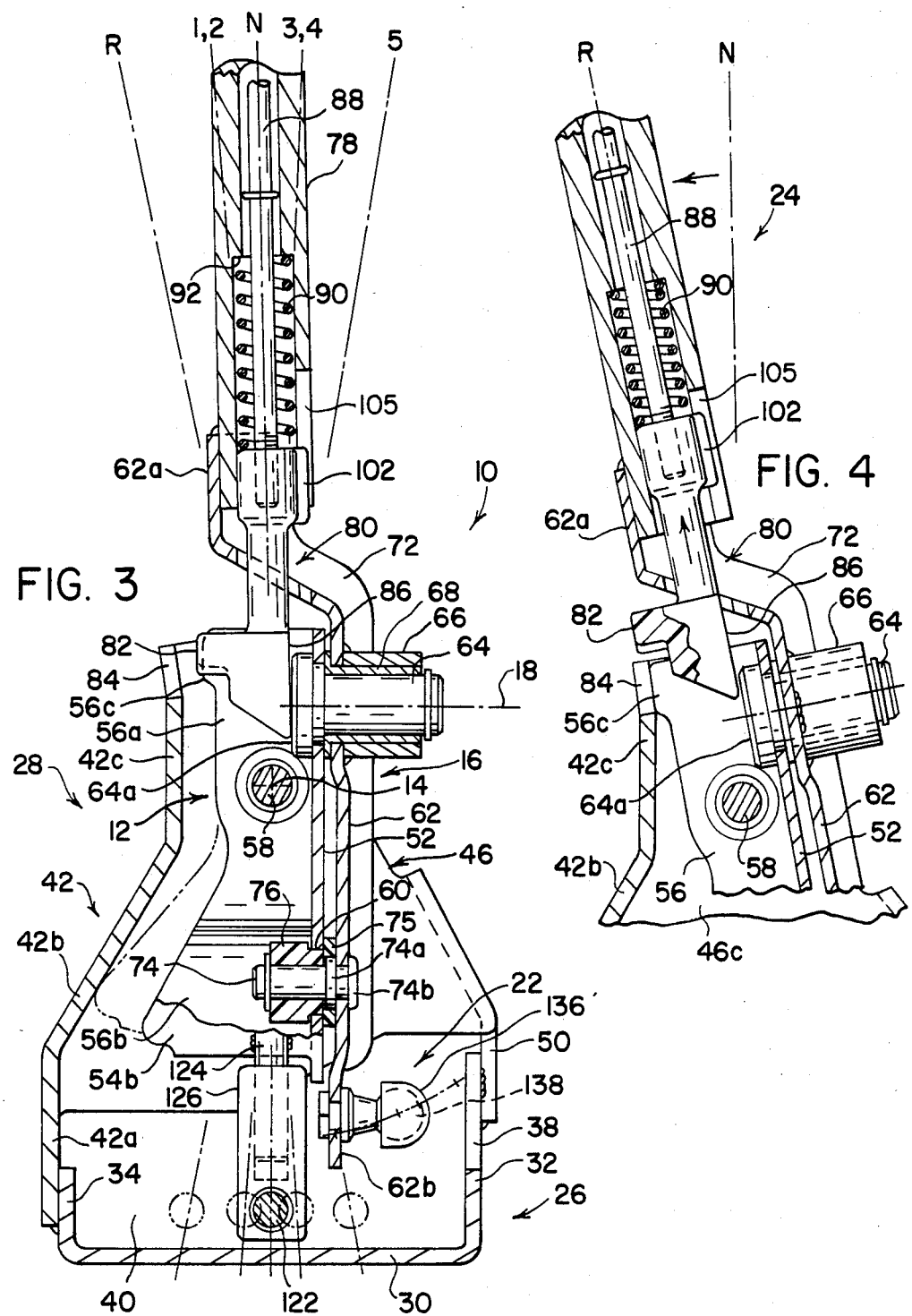

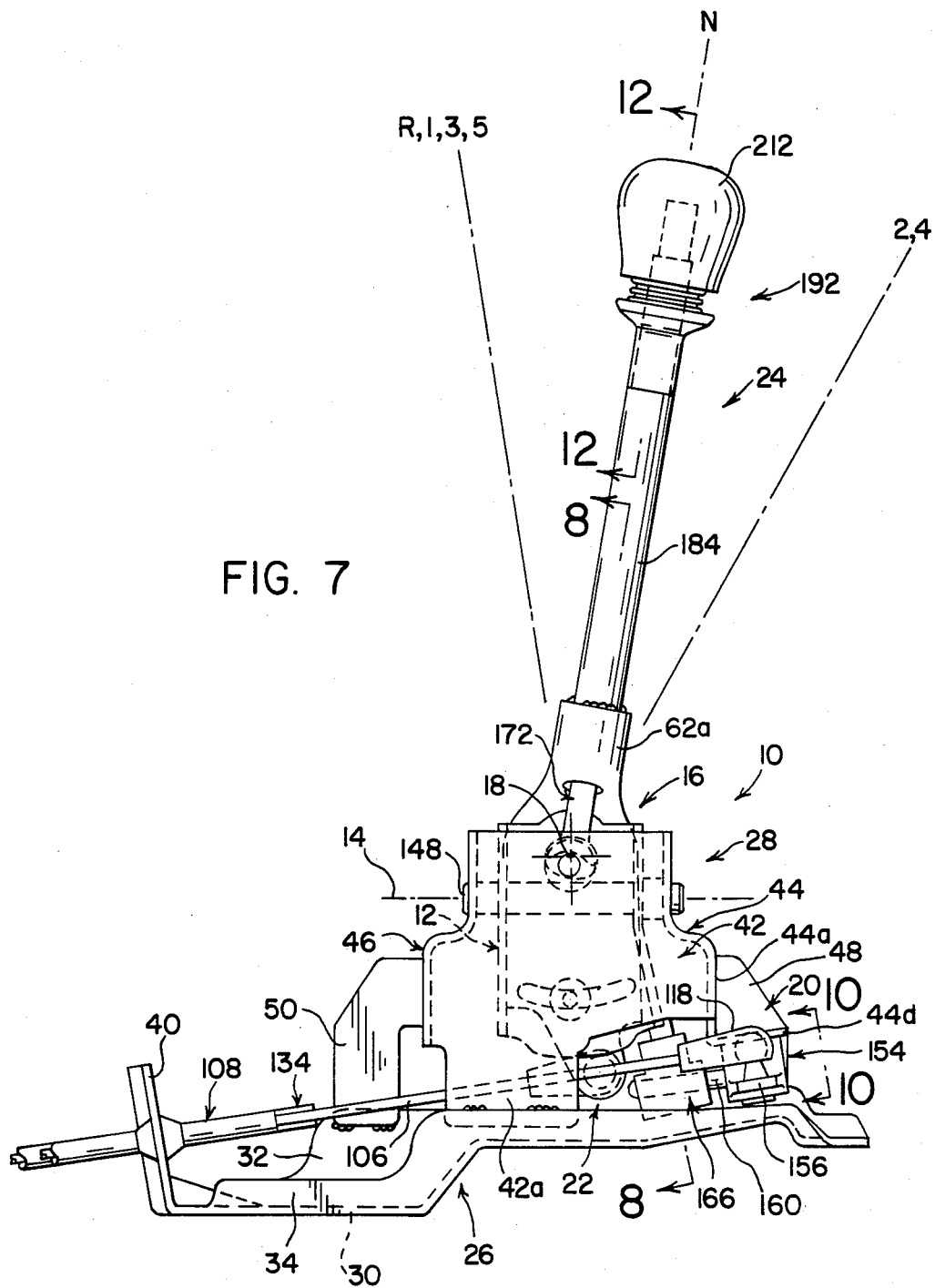

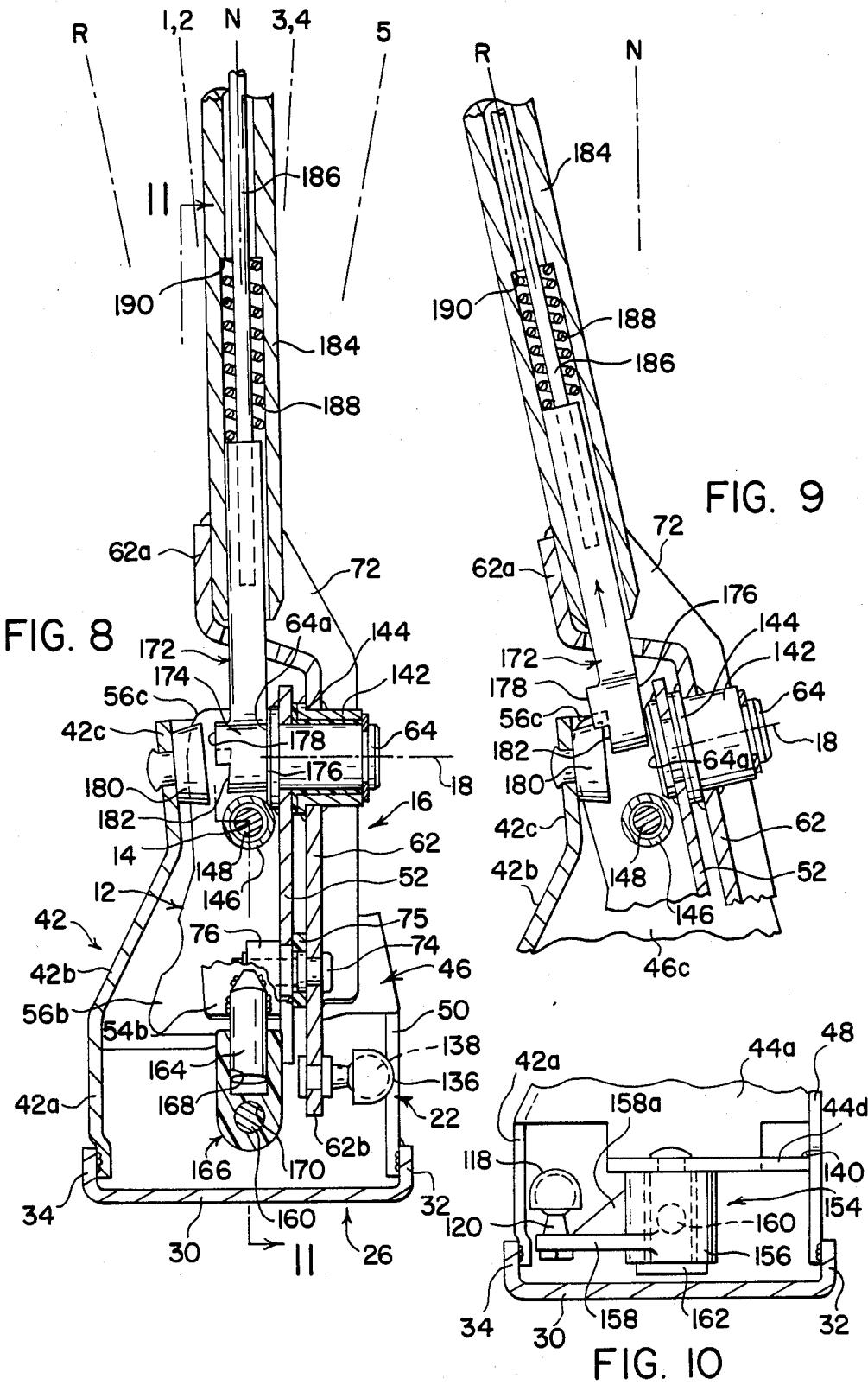

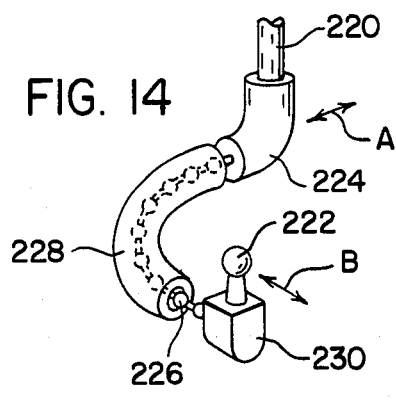
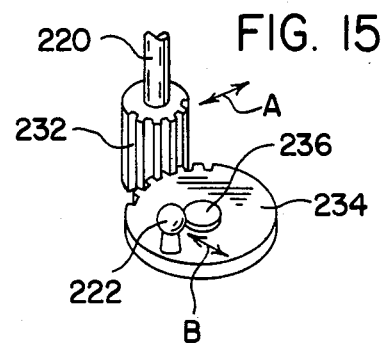
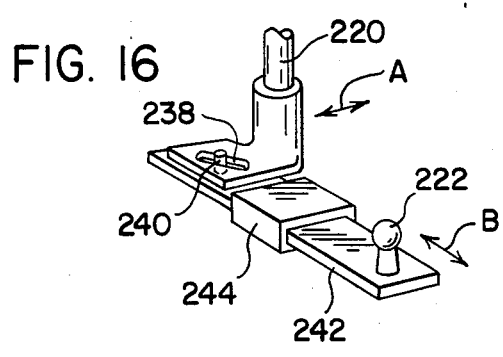
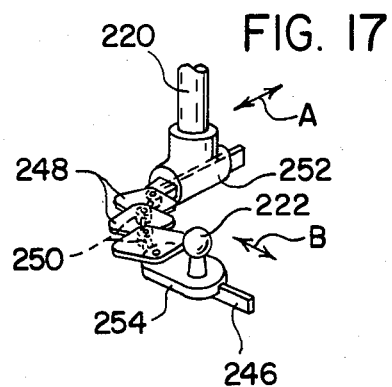
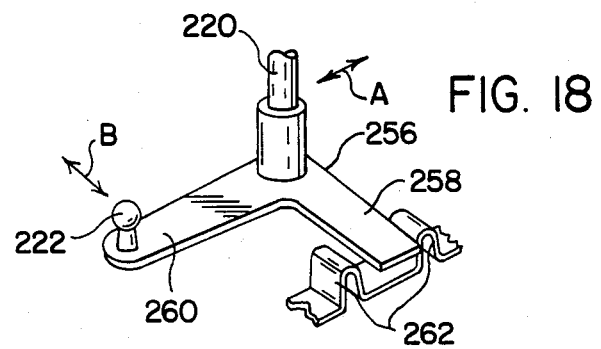

MANUALLY OPERABLE GEARSHIFT MECHANISM

BACKGROUND OF THE INVENTION

This invention relates to the art of gearshifting mechanisms and, more particularly, to improvements in manually operable gearshift mechanisms for shifting gears in a transmission.

It is of course well known that transmissions such as automobile transmissions provide a plurality of selectable gear combinations, and it is likewise well known that certain of such transmissions provide for the gears to be shifted from one combination to another through appropriate positioning of a pair of gearshift operators associated with the transmission and displaced relative to one another and to the transmission housing by generally linearly displaceable gearshift actuating cables. The latter cables are linearly displaced through the vehicle operator's manipulation of a manual gearshift mechanism in the vehicle and which includes a pivotal gear selector member for each cable. Upon pivotal displacement of the gear selector members relative to one another and to a common support therefor, the pivotal displacement of each member is translated to a linear displacement of the corresponding cable. In connection with the operation of an automobile, the gear combinations available include a neutral gear relationship, a reverse gear, and a plurality of forward drive gear ratios which today often include five forward drive gear ratios.

Examples of manually operable gearshift mechanisms heretofore provided for achieving such transmission gear changes are shown in U.S. Pat. No. 4,143,560 to Kinkade et al and U.S. Pat. No. 4,245,521 to Osborn. Mechanisms such as those disclosed in the latter patents, while effective for the intended gearshifting purpose, are structurally complex and thus both excessively heavy and undesirably expensive to produce. More particularly in this respect, the constructions have required the use of a number of interengaging component parts requiring close tolerances and finished surfaces involving time consuming and expensive machining operations and assembly operations. Moreover, such constructions are undesirably heavy as a result of the number of component parts and the size and weight thereof and, additionally, are undesirably large with respect to the outside dimensions thereof. Furthermore, structurally complex arrangements for translating motion within the gearshift mechanisms and for providing lockout with respect to unintentional shifting into the reverse positions thereof, have added to the cost and weight of the mechanisms while at the same time rendering the efficiency and stability with respect to the operation thereof less than is desired.

SUMMARY OF THE INVENTION

In accordance with the present invention, the foregoing and other disadvantages of manually operable gearshift mechanisms heretofore provided are minimized or overcome by a construction comprised of a minimum number of component parts which can be readily and economically produced and assembled, and which are structured and structurally interrelated to promote obtaining necessary positional relationships between the parts during assembly while, at the same time, providing a light weight structurally compact unit. These attributes are achieved in part through an improved structural arrangement for supporting a pair of gear selector components and displacing corresponding gearshift actuators such as cables thereby to achieve gear changes in a transmission. More particularly in this respect, a two piece sheet metal support is provided for the gear selector components, one of which selector components is mounted on the support for pivotal movement relative thereto and the other of which selector components is mounted on the first component for pivotal movement therewith and for pivotal movement relative thereto. Pivotal displacements of the selector components are limited by interengaging relationships which simplify the overall structure while providing optimum stability during pivotal movement.

Pivotal movements of the gear selector components are achieved through an operating lever attached to the second gear selector component, and pivotal movement of the two gear selector components to a plurality of different positions relative to the support and to one another results in generally linear displacements of the gearshift actuator cables. Another improvement in accordance with the present invention resides in the location and structural interconnection between one of the gear selector components and a motion translation member by which pivotal movement of the latter gear selector component is translated into linear displacement of the corresponding actuator cable. As will become apparent hereinafter, this improvement lends to achieving the desired motion translation with improved efficiency and, importantly too, improves structural stability and thus feel in connection with manual shifting operations by an operator. Moreover, these attributes are achieved with a minimum number of parts, thus reducing both weight and cost and, in accordance with one embodiment, through a structural mounting of the motion translating member on the support which promotes accuracy during assembly of the mechanism with respect to achieving desired relative positioning between component parts thereof.

Yet another improvement resides in unique arrangements for selectively locking out displacement of the gear selector components to the reverse gear positions thereof. As will become apparent hereinafter, the lockout arrangements provide improved stability and feel in connection with gear shifting operations, and achieve the latter through structurally simple operating interrelationships with the gear selector component and support which provide improved operating efficiency and a reduction in weight and cost.

Preferably, the first and second gear selector components of the mechanism, as well as the two piece support therefor, are defined by stamped sheet metal plate members. This enables the parts to be readily and economically produced and, as will become apparent hereinafter, enables a structural interrelationship therebetween which lends to dimensional compactness and economy with respect to assembly time, while promoting simplicity in operation and a desired structural integrity for the mechanism.

It is accordingly an outstanding object of the the present invention to provide improvements in connection with manually operable gearshift mechanisms for use with transmissions having a plurality of gear selections each of which is achieved through the relative positioning of a pair of gearshift actuators displaced in response to operation of the gearshift mechanisms.

Another object is the provision of an improved gearshift mechanism of the foregoing character wherein transmission gear selection is achieved through the manipulation of a pair of gear selector components pivotal together in one direction relative to a support therefor, and one of which shift components is pivotal relative to the other, and wherein such pivotal movements are translated into reciprocable displacement of corresponding gearshift actuators.

Still another object is the provision of an improved gearshift mechanism of the foregoing character in which one of the gear selector components is structurally interrelated with a motion translating member to translate pivotal movement of the selector component into reciprocation of the corresponding cable with improved structural stability and operating efficiency.

Another object is the provision of an improved gearshift mechanism of the foregoing character in which the motion translating member is mounted on the support in a manner which promotes achieving desired positional relationships between component parts of the mechanism during assembly thereof.

Yet another object is the provision of an improved gearshift mechanism of the foregoing character in which the gear selector components and support are structured and structurally interrelated in a manner whereby pivotal displacements of the selector components is stabilized and limited by interengagements between the several parts.

A further object is the provision of a gearshift mechanism of the foregoing character having an improved selectively operable lockout arrangement to prevent unintentional displacement of the gear selector components into the reverse gear positions thereof and by which improved stability, efficiency in operation and structural simplicity are realized in connection therewith and with gearshifting operation of the gearshift mechanism.

Yet a further object is the provision of an improved gearshift mechanism of the foregoing character comprised of a minimum number of component parts which are structured and structurally interrelated with one another in a manner which promotes economy in part production and assembly, and a compact, light weight gearshift mechanism.

BRIEF DESCRIPTION OF THE DRAWINGS

The foregoing objects, and others, will in part be obvious and in part pointed out more fully hereinafter in conjunction with the written description of preferred embodiments illustrated in the accompanying drawings in which:

FIG. 3 is a cross-sectional elevation view taken along line 3—3 in FIG. 1;

FIG. 4 is an enlarged sectional elevation view similar to FIG. 3 and showing the lockout member in its released position;

FIG. 7 is a side elevation view of another embodiment of the gearshift mechanism in accordance with the present invention;

FIG. 8 is a cross-sectional elevation view of the mechanism as seen along line 8—8 in FIG. 7;

FIG. 9 is an enlarged sectional elevation view similar to FIG. 8 and showing the lockout member in its released position;

FIG. 10 is an elevation view, partially in section, taken along line 10—10 in FIG. 7;

FIGS. 14-18 are perspective views of alternative arrangements for translating lateral pivotal movement of a gearshift selector plate into longitudinal reciprocating displacement of the corresponding gearshift actuator.

DESCRIPTION OF PREFERRED EMBODIMENTS

Figure 1:
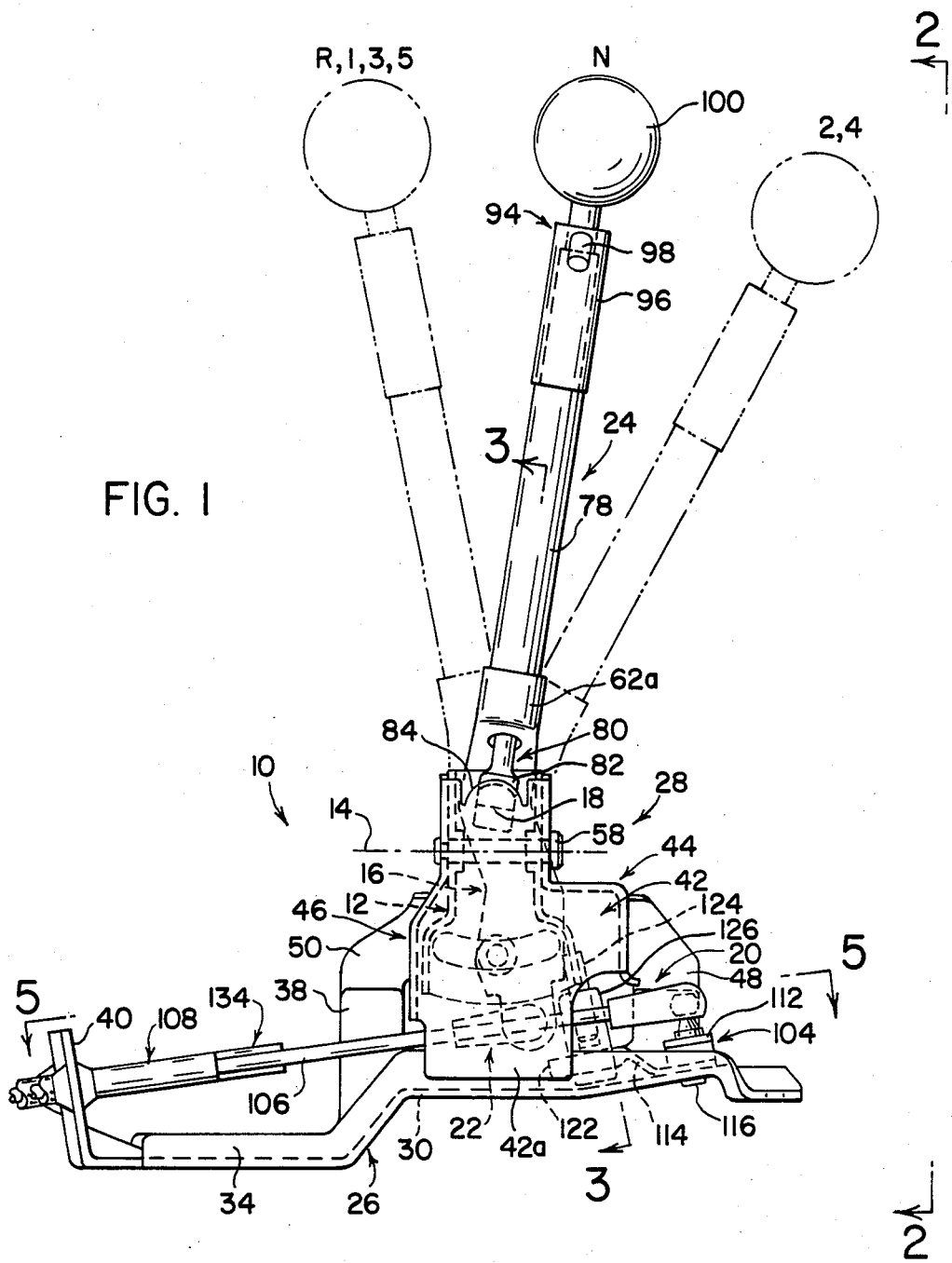
FIG. 1 is a side elevation view of one embodiment of a gearshift mechanism in accordance with the present invention.

Referring now in greater detail to the drawings wherein the showings are for the purpose of illustrating preferred embodiments of the invention only, and not for the purpose of limiting the invention, a gearshift mechanism according to the present invention is shown in FIG. 1-6 as including a support structure 10, a first gear selector component 12 mounted thereon for pivotal movement in opposite directions about a first axis 14, and a second gear selector component 16 mounted on component 12 for pivotal movement therewith about axis 14 and for pivotal movement relative thereto about a second axis 18 transverse to axis 14. The mechanism further includes first and second gearshift actuator assemblies 20 and 22 respectively interconnected with the first and second gear selector components. Actuator assembly 20 includes an actuator member, such as a cable, interconnected with first gear selector component 12 for reciprocating movement relative to support 10 in response to pivotal movement of the first selector component 12 about axis 14, and actuator assembly 22 includes a similar actuator member interconnected with second gear selector component 16 for reciprocating movement relative to the support in response to pivotal movement of the second selector component about axis 18. As will be described more fully hereinafter, the first and second gear selector components are pivotal to a plurality of different positions relative to support 10 and to one another and each of which positions corresponds to a different one of the selectable transmission gears, and the mechanism includes an operating lever assembly 24 for pivoting the gear selector components between the positions thereof.

Figure 6:
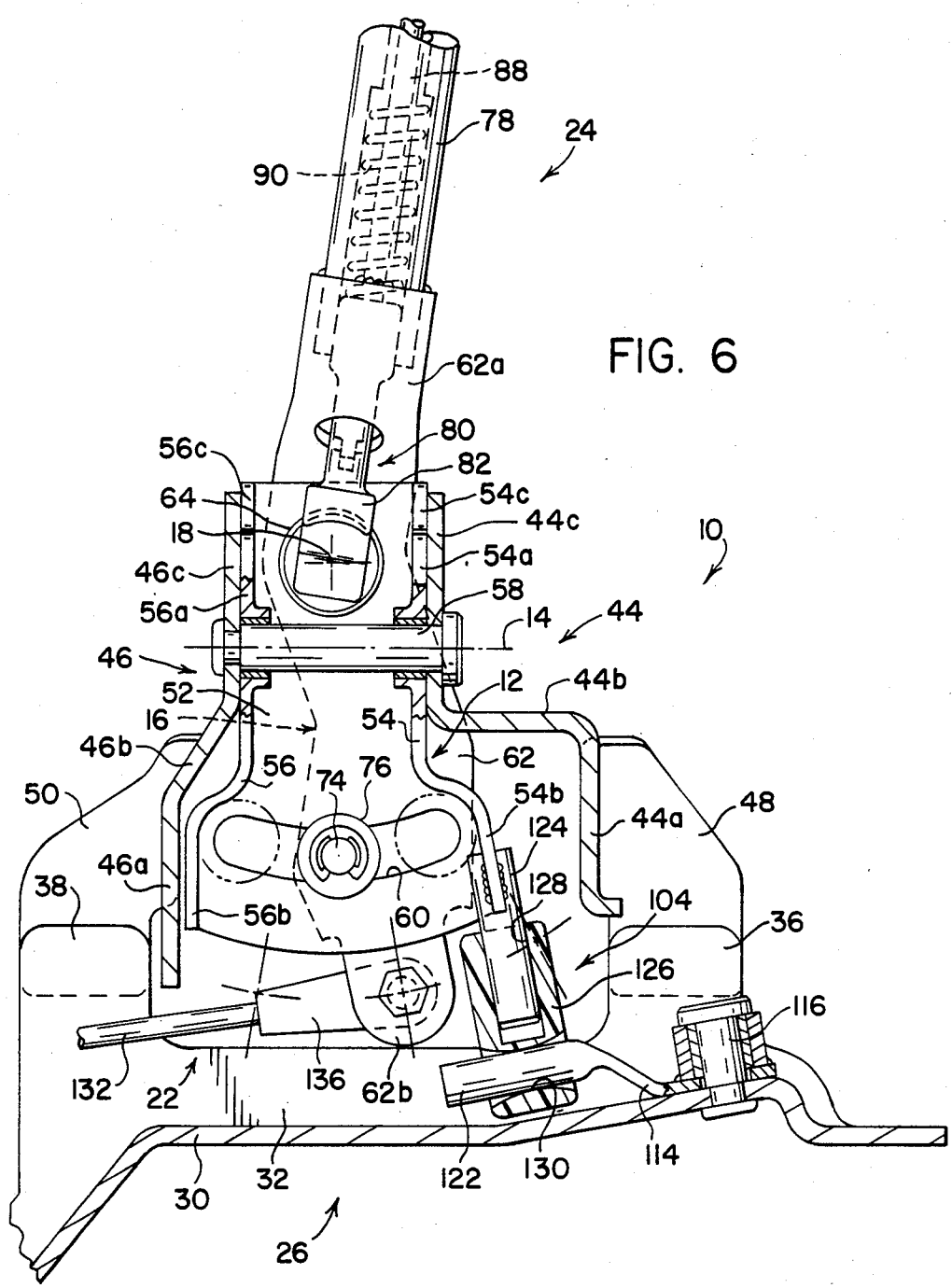
FIG. 6 is a sectional view of the lockout assembly taken along line 6—6 in FIG. 2.

In the preferred embodiments, support 10 is of sheet metal construction and is comprised of just two components, namely an elongate lower member 26 and an upper member 28 which is secured thereto such as by welding and which supports gear selector components 12 and 16 as set forth more fully hereinafter. Lower portion 26 includes a bottom wall 30, upwardly extending flanges 32 and 34 along the opposite sides thereof and flange 32 of which includes a pair of upwardly extending tabs 36 and 38 spaced apart along the length thereof. One end of lower portion 26 is provided with an upwardly extending flange 40 supporting portions of gearshift actuator assemblies 20 and 22 as set forth more fully hereinafter. Lower portion 26 further provides for mounting the gearshift mechanism on a suitable underlying support and is provided with a plurality of openings 41 through bottom wall 30 for this purpose. Upper portion 28 of support 10 is of one piece sheet metal construction and includes a side wall 42 which, as best seen in FIG. 3, includes a lower portion 42a overlying and welded to flange 34 of lower portion 26, an inwardly inclined intermediate portion 42b, and an upwardly extending upper end portion 42c. Upper portion 28 further includes laterally extending end walls 44 and 46 at opposite ends of side wall 42. As best seen in FIG. 6, end wall 44 includes an upwardly extending portion 44a, a horizontally extending intermediate portion 44b and an upwardly extending upper end portion 44c, and wall 46 includes an upwardly extending lower portion 46a, an inclined intermediate portion 46b, and an upwardly extending upper end portion 46c. Wall portion 44a is provided with a rigidifying flange 48 integral therewith and having a lower end overlying and welded to tab 36 of flange 32 of lower support portion 26, and wall portions 46a and 46b similarly include a rigidifying flange 50 integral therewith and having a lower portion overlying and welded to tab 38 of flange 32. Flanges 48 and 50 extend outwardly from the corresponding end of upper support portion 28, whereby the corresponding side of upper portion 28 is open.

In the preferred embodiments, first and second gear selector components 12 and 16 are also of sheet metal construction. As best seen in FIGS. 3 and 6 of the drawing, first gear selector component 12 is generally channel shaped in cross-section and includes a vertically and longitudinally extending plate portion 52 and flanges 54 and 56 at the longitudinally opposite ends thereof and extending laterally inwardly therefrom. The upper ends 54a and 56a of flanges 54 and 56 are received between end wall portions 44c and 46c of the support assembly, and the first gear selector plate is pivotally mounted thereon by means of a pin 58 extending through the wall portions and plate flanges and providing pivot axis 14. Suitable bearings, not designated numerically, are preferably interposed between pin 58 and the openings through the upper ends of flanges 54 and 56, and it will be appreciated that wall portions 44c and 46c of the support assembly interengage with upper ends 54a and 56a of the flanges to provide longitudinal support and lateral guidance for the selector plate during pivotal movements thereof about axis 14. The lower end of plate 52 is longitudinally wider than the upper end and is provided with a longitudinally extending arcuate slot 60 for the purpose set forth hereinafter, and the lower ends 54b and 56b of flanges 54 and 56 diverge both lontiduainally and laterally with respect to the upper ends thereof for the purposes set forth hereinafter.

Figure 2:
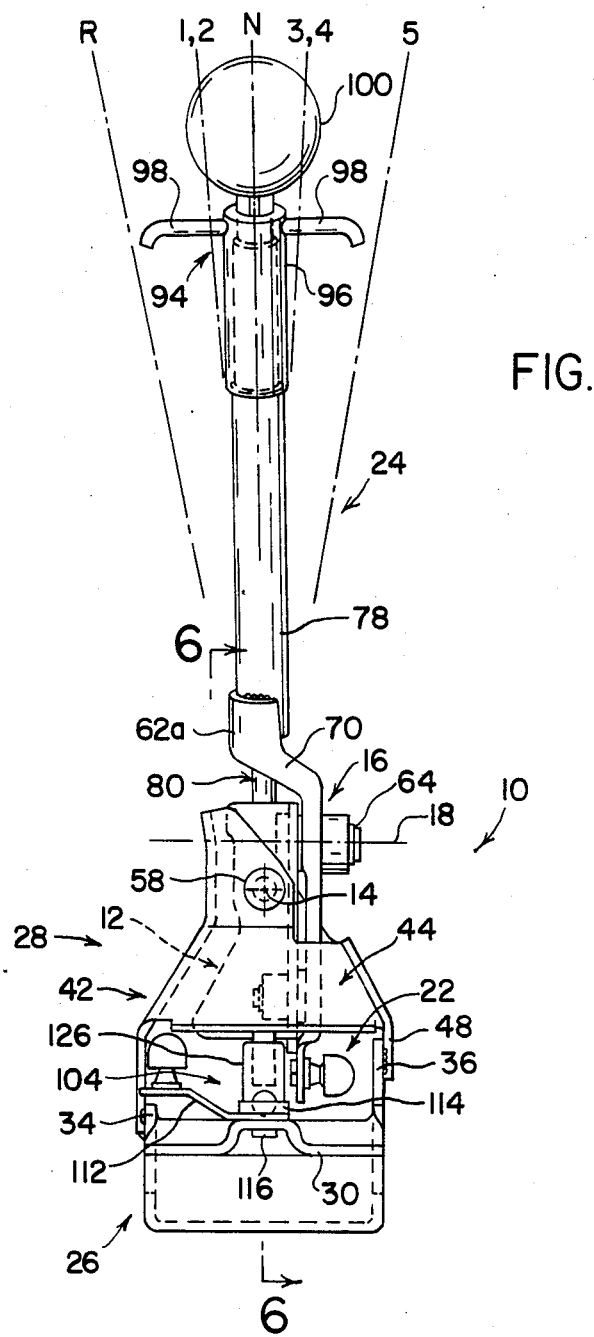
FIG. 2 is an end elevation view of the mechanism as seen along line 2—2 in FIG. 1.

As best seen in FIGS. 2, 3 and 6 of the drawing, second gear selector component 16 is of sheet metal construction and includes an upwardly extending plate portion 62 outwardly adjacent and parallel to plate 52 and pivotally mounted thereon by means of a pin 64 which provides second pivot axis 18. More particularly in this respect, plate portion 62 is provided with a mounting sleeve 66 which is welded thereto to rigidify the pivotal support of the plate and, preferably, a suitable bearing sleeve 68 is interposed between pin 64 and sleeve 66. Plate portion 62 includes an upper end 62a and a lower end 62b, and is provided along its opposite sides and between the upper and lower ends with laterally outwardly extending rigidifying flanges 70 and 72. Further, plate portion 62 is provided intermediate pin 64 and lower end 62b with a guide and stabilizing pin 74 which has an integral collar 74a engaging against the inner side of plate 62 and is headed at 74b so as to be securely fastened to plate 62. Pin 74 extends from collar 74a through slot 60 in plate 52 and is Provided on its inner end with an annular bumper or stop member 76 of suitable plastic or rubber and which is disposed between the lower ends 54b and 56b of flanges 54 and 56 on plate 52. A spacer ring 75, preferably of suitable plastic material, is interposed between plates 52 and 56 in surrounding relationship with collar 74a, and the axially inner end of bumper 76 extends through slot 60 and abuts against ring 75, whereby it will be appreciated that the pin, ring and bumper cooperatively interengage the lower ends of plates 52 and 62 against lateral displacement relative to one another. The latter advantageously provides stability with respect to pivotal displacements of the selector plates and improves feel for the vehicle operator in connection with achieving such pivotal displacements. Moreover, the interconnection against relative lateral separation of plates 52 and 62 advantageously promotes longer life for the bearing sleeve 68 of the pivotal connection between the plates provided by pin 64 and sleeve 66. In this respect, it will be appreciated that relative lateral displacement between the plates would impose stress on and thus promote wear of the bearing sleeve 68.

From the foregoing description, it will be appreciated that first gear selector plate 52 is pivotal in laterally opposite directions about axis 14, and that second gear selector plate 62 is both pivotal with plate 52 about axis 14 and is pivotal relative thereto in longitudinally opposite directions about axis 18. As mentioned above, pin 74, ring 75 and bumper 76 engage plates 52 and 62 against lateral separation to stabilize the plates during pivotal movements about both axes 14 and 18. Additionally, bumper 76 on the inner end of pin 74 is adapted to engage the lower ends of flanges 54 and 56 to limit the extent of pivotal displacement of plate member 62 relative to plate 52 in opposite directions about axis 18, as will be appreciated by the broken line positions of the bumper shown in FIG. 6. As will likewise be appreciated from FIG. 3, lower ends 54b and 56b of the flanges on plate 52 are adapted to engage portion 42b of side wall 42 in response to pivotal movement of first gear selector plate 52 clockwise about axis 14 in FIG. 3, thus to limit such pivotal movement of selector plate 52.

Pivotal displacements of gear selector plates 52 and 62 relative to axes 14 and 18 is achieved by means of operating lever assembly 24 which is attached to upper end portion 62a of plate 62. In the embodiment illustrated in FIGS. 1-6, the operating lever assembly includes a tubular body portion 78 secured to upper end 62a such as by welding, and it will be noted that end 62a is laterally offset inwardly with respect to plate portion 62 so as to generally centrally overlie the upper end of the support assembly. Lever assembly 24 supports a vertically reciprocable lockout member 80 which is cooperable with the support assembly to prevent pivotal displacement of gear selector plates 52 and 62 into the reverse gear positions thereof in the absence of intentional displacement of the lockout member to release the gear selector plate for displacement into the latter position. For the latter purpose, the lower end of lockout member 80 includes a projection 82 extending laterally outwardly beyond flange projections 54c and 56c at the upper ends of flanges 54 and 56 of selector plate 52, as will be best appreciated from FIG. 3 of the drawing. As will be further appreciated from FIGS. 1 and 3, upper portion 42c of wall 42 of the support assembly is contoured to provide an arcuate stop tab 84 laterally facing projection 82, whereby it will be understood that when lockout member 80 is in its locking position as shown in FIG. 3 projection 82 is adapted to abut against tab 84 upon pivotal movement of the gear selector plates counterclockwise about axis 14 from the position shown in the latter Figure. The lower end of lockout member 80 further includes a planar inner surface 86 facially engaging inner surface 64a of pivot pin 64. Such facial engagement stabilizes the lockout member and the gear selector plates when the latter are pivoted to bring projection 82 into engagement with stop tab 84.

When the lockout member is displaced upwardly to the position shown in FIG. 4, projection 82 is elevated about stop tab 84, thus releasing the gear selector plates for pivotal movement further in the counterclockwise direction. As further shown in FIG. 4, the latter pivotal movement is then limited by engagement of upper ends 54c and 56c of flanges 54 and 56 with the upper end of wall portion 42c on the longitudinally opposite sides of tab 84. As will become apparant hereinafter, when projection 82 abuts against stop tab 84 the gear selector plates are positioned for shifting into either the first or second gear positions, and when the selector plate flanges engage wall portion 42c as shown in FIG. 4 the selector plates are positioned for shifting into the reverse gear position.

Displacement of lockout member 80 between the locking and released positions thereof can be achieved in any suitable manner and, in the embodiment illustrated in FIGS. 1-6, tubular body portion 78 of the operating lever assembly is provided with a vertically displaceable operating rod 88 to which the upper end of lockout member 80 is secured such as by a threaded or knurled interengagement therewith. The lockout member is biased downwardly into its locking position by means of a coil spring 90 between the upper end of the lockout member and a shoulder 92 in the lower end of body portion 78, and is displaced upwardly against such bias by means of an actuating handle assembly 94. Handle assembly 94 includes a sleeve member 96 reciprocably supported on tubular body 78 and provided with handle members 98, and the handle assembly is suitably interconnected with the upper end of rod 88 so that upward displacement of the handle assembly relative to a knob 100 on the upper end of body portion 78 results in an upward displacement of lockout member 80. Preferably, the upper end of lockout member 80 is provided with a radially outwardly extending guide flange 102 slidably received in a slot 105 in the lower end of body portion 78 so as to prevent rotation of the lockout member relative to the axis of rod 88. It will be appreciated from the foregoing description that the lockout arrangement is structurally simple and efficient, and that the structure thereof and the operating relationship thereof in connection with the selector plates and support assembly 10 promotes vertical compactness and the use of a minimum number of component parts. More particularly in this respect, compactness and minimizing of parts are promoted by locating the lockout component adjacent the upper end of the support assembly as opposed to an internal area which requires room for operation thereof without interferring with the selector plate movements. Further advantage with respect to the location and structure of the lockout components resides in a reduction in assembly time and accessibility for repair or replacement operations.

Figure 5:
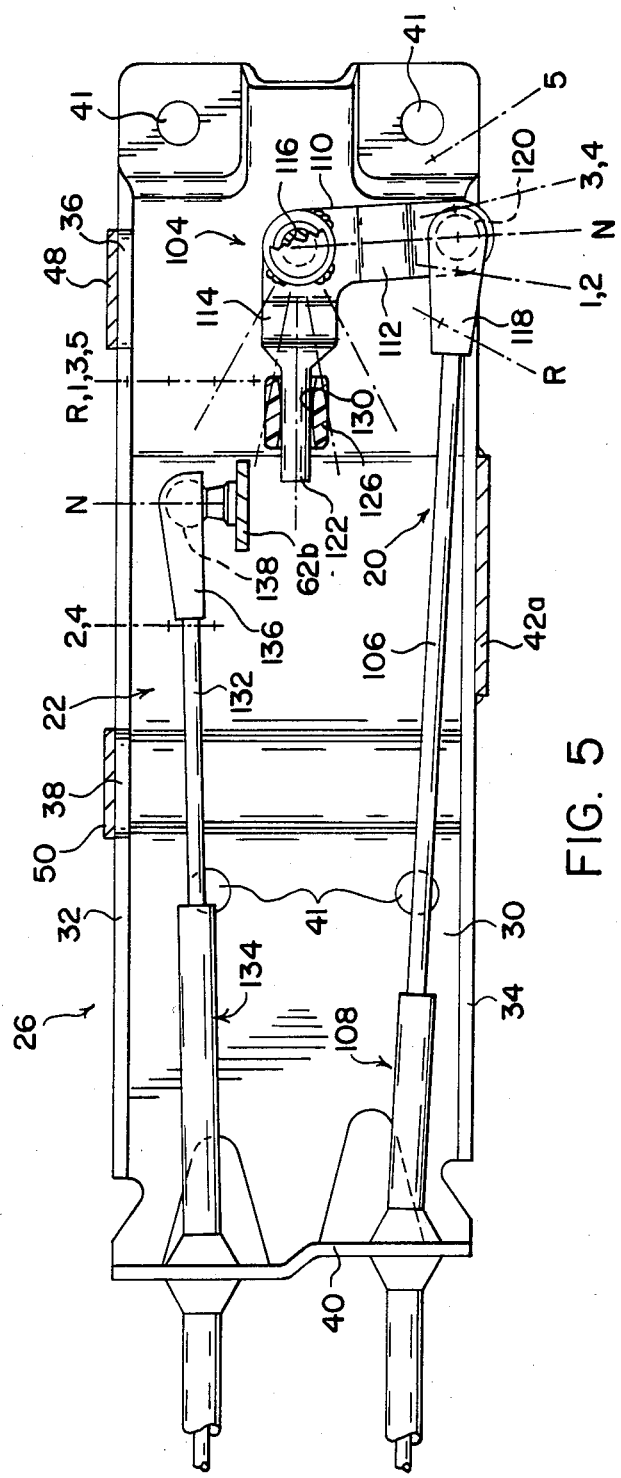
FIG. 5 is a plan view, partially in section, as seen along line 5—5 in FIG. 1.

Pivotal displacement of first gear selector plate 52 about axis 14 is adapted to impart reciprocating movement to first gearshift actuator assembly 20, and pivotal displacement of second gear selector plate 62 about axis 18 is adapted to impart reciprocating movement to second gearshift actuator assembly 22. Accordingly, it will be appreciated that pivotal movement of the two gear selector plates to a given position relative to support assembly 10, and which position corresponds to a selected gear for the transmission, results in the positioning of gearshift actuator assemblies 20 and 22 in positions relative to the support assembly and one another corresponding to the selected gear. Thus, the latter are displaceable to positions by which corresponding operating components associated with the transmission are positioned to achieve shifting to the selected gear. As best seen in FIGS. 3, 5 and 6 of the drawing, pivotal displacement of the first gear selector plate 52 about axis 14 is translated into reciprocating movement of the first gearshift actuator assembly 20 by means of a linkage assembly 104 between lower end 54b of flange 54 and the inner end of gearshift actuator assembly 20. More particularly, in this respect, actuator assembly 20 includes a gearshift actuating member 106 such as a cable or rod member reciprocably supported by flange 40 of lower portion 26 of the support assembly by means of a tubular guide component 108 suitably mounted to extend from opposite sides of flange 40 and through which the cable extends for connection with the corresponding transmission operating member. Linkage assembly 104 includes an L-shaped lever 110 having a laterally outwardly extending leg 112 and a longitudinally extending leg 114. Lever 110 is mounted on bottom wall 30 of lower support portion 26 by means of a pin 116, whereby the lever is pivotal about an upwardly extending axis between legs 112 and 114. Actuating member 106 is pivotally interconnected with lever 110 by means of a socket member 118 on the inner end of member 106 and a ball pin 120 staked on the outer end of leg 112 of the lever. Leg 114 of lever 110 terminates in a circular post 122, and linkage assembly 104 further includes a circular post 124 welded or otherwise secured to lower end 54b of flange 54 of gear selector plate 52, and a coupling component 126 of suitable plastic material interconnecting posts 122 and 124. More particularly in this respect, as best seen in FIGS. 3, 5 and 6, post 124 depends from flange portion 54b and is received in an elongate circular opening 128 provided therefor in the upper end of coupling 126 and by which the coupling is vertically slidable and rotatable relative to post 124. Circular post 122 of lever 110 extends longitudinally through an opening 130 in the lower end of the coupling component and by which opening post 122 is slidably and pivotally displaceable relative to the coupling component. Accordingly, it will be appreciated from FIGS. 3, 5 and 6 of the drawing that pivotal displacement of first gear selector plate 52 in opposite directions about axis 14 is translated through coupling component 126 and lever 110 into reciprocating movement of gearshift actuator member 106 longitudinally opposite directions relative to lower support portion 26. It will be further noted at this point that the structural location of lever 110 in close proximity to flange portion 54b of gear selector plate 52 advantageously enables coupling of the gear selector plate and lever 110 in a manner which promotes compactness and minimizes free play with respect to translating pivotal movement of the gear selector plate to longitudinal displacement of gearshifting cable 106, thus promoting stability with respect to feel by the operator during shifting operations.

As mentioned hereinabove, pivotal displacement of second gear selector plate 62 about axis 18 is adapted to impart reciprocation in longitudinally opposite directions to second gearshift selector assembly 22 and, as best seen in FIGS. 3, 5 and 6, such reciprocation of the actuator assembly is achieved by pivotally connecting the rod or cable gearshift actuator member 132 thereof directly to lower end 62b of plate member 62. More particularly in this respect, actuator member 132 is supported for longitudinal reciprocation relative to flange 40 of lower support portion 26 by means of a tubular guide assembly 134 mounted on flange 40, and the innermost end of cable 132 is pivotally interconnected with lower end 62b of gear selector plate 62 by means of a socket member 136 on the inner end of member 132 and a ball pin component 138 mounted on plate end 62b. Accordingly, as will be appreciated from FIG. 6, pivotal movement of gear selector plate 62 in opposite directions about axis 18 results in reciprocating movement of gearshift actuator member 132 in longitudinally opposite directions relative to lower support portion 26.

In the drawings, except for FIG. 4, the component parts of the gearshift mechanism are shown in the neutral gear position designated N, and the positions of the operating lever assembly 24 corresponding to the reverse and five forward speed gears are shown in phantom in FIG. 1 and by broken lines in FIG. 2 and are respectively designated by the letter R and the numerals 1, 2, 3, 4 and 5. Corresponding positions for the first and second gearshift actuator members 106 and 132 are indicated in FIG. 5 by the same designations, each with respect to the axis of the corresponding ball pin at the inner end thereof. With this in mind, together with the foregoing description of the component parts of the gearshift mechanism, it will be appreciated that displacement of operating lever assembly 24 to the far left in FIG. 2 and thence to the left in FIG. 1 positions the gear selector plates 52 and 62 in the reverse gear positions thereof relative to one another and to the support assembly, and which positioning requires release of the lockout member 80 as described hereinabove It will be further appreciated that such displacement of the operating lever assembly to the left in FIG. 2 pivots the lower end of first actuator plate 52 counterclockwise about axis 14, thus to displace the first gearshift actuator 106, through the operation of linkage assembly 104, from the neutral to the reverse position thereof shown in FIG. 5. Pivotal displacement of the operating lever assembly to the left in FIG. 1 and into the reverse position pivots the lower end of second gear selector plate 62 counterclockwise about axis 18, thus to displace the second gearshift actuator 132 from the neutral to the reverse position shown in FIG. 5. Accordingly, it will be appreciated that such displacement of the operating lever assembly results in a positioning of gearshift actuators 106 and 132 relative to the support assembly and to one another in positions whereby the transmission gearshift operators connected to the actuators are relatively positioned for the transmission to be in the reverse gear mode.

It will be appreciated from the foregoing description, that each displacement of the operating lever assembly 24 to the right or left of the neutral position shown in FIG. 2 results in pivotal movement of the first and second gear selector plates together about axis 14 and positioning of the first gearshift actuator 106 in a position relative to lower portion 26 of the support assembly corresponding to the selected gear position of the operating lever assembly. Displacement thereafter of the operating lever assembly from each of the lateral positions just described either to the right or left of the neutral position shown in FIG. 1 then results in pivotal displacement of second actuator plate 62 relative to first plate 52 about axis 18 and thus displacement of the second gearshift actuator 132 to a position relative to lower support portion 26 corresponding to the selected gear position of the operating lever assembly. Accordingly, the transmission is adapted to be shifted to the first and second forward speed gears by displacement of operating lever mechanism 24 to the left from the neutral position shown in FIG. 2 to the position designated by the numerals 1 and 2, and thence either to the left in FIG. 1 to the position designated by the numeral 1 or to the right to the position designated by the numeral 2. Further in connection with the pivotal displacement of operating lever mechanism 24 into either of the first or second gear positions, it will be noted that projection 82 of lockout member 80 engages tab 84 as mentioned hereinbefore to laterally position the gear selector plates prior to displacement of selector plate 62 about axis 18 into one or the other of the first and second positions. Both feel and stability with respect to such lateral positioning are advantageously achieved as a result of the capturing of the lower end of lockout member 80 between tab 84 and surface 64a of pivot pin 64. Furthermore, it will be noted that the projection 82 of lockout member 80 engages against tab 84 during pivotal displacement of selector plate 62 about axis 18 into the first and second gear positions, whereby such feel and stability are also achieved during these shifting movements. Shifting to the fhird or fourth forward speed gears is achieved by displacing operating lever assembly 24 to the right from the neutral position illustrated in FIG. 2 and to the position designated by the numerals 3 and 4 and thence either to the left from the neutral position shown in FIG. 1 to the position designated by the numeral 3 or to the right to the position designated by the numeral 4. Shifting to the fifth forward speed gear is achieved by displacing the operating lever assembly to the full right position shown in FIG. 2 and thence to the left in FIG. 1 to the position designated by the numeral 5. It will be appreciated from FIG. 5 that in each of the selected gear positions of the operating lever assembly, the first and second gearshift actuators 106 and 132 are disposed in different positions relative to the support assembly and to one another and each of which relative positions corresponds to the selected gear position of the operating lever assembly.

With reference now to FIGS. 7–13 of the drawing, there is illustrated another embodiment of a gearshift mechanism in accordance with the present invention and which is comprised of the same basic component parts as the mechanism illustrated in FIGS. 1–6. Accordingly, reference numerals are used in FIGS. 7–13 with respect to component parts which at least generally correspond structurally and functionally to component parts of the mechanism described hereinabove. With this in mind, the gearshift mechanism shown in FIGS. 7–13 includes a support structure 10, a first gear selector component 12 mounted thereon for pivotal movement in opposite directions about a first axis 14, and a second gear selector component 16 mounted on component 12 for pivotal movement therewith about axis 14 and for pivotal movement relative thereto about a second axis 18 transverse to axis 14. The mechanism further includes first and second gearshift actuator assemblies 20 and 22 respectively interconnected with the first and second gear selector components.

Support 10 is of sheet metal construction and is comprised of a lower member 26 having a bottom wall 30, side flanges 32 and 34 and an upwardly extending flange 40 supporting portions of gearshift actuator assemblies 20 and 22. Support 10 further includes an upper portion 28 having a side wall 42 and opposite end walls 44 and 46 which, while of slightly different contour from the corresponding walls of the embodiment shown in FIGS. 1–6 have lower, intermediate and upper wall portions numerically corresponding to those shown in FIGS. 1–6. Further, lower wall portions 44a and 46a have flanges 48 and 50 which, together with lower wall portion 42a, provide for joining upper member 28 to lower member 26. One important difference, however, resides in the fact that lower wall portion 44a of wall 44 terminates in a forwardly extending mounting plate portion 44d which is integral therewith and welded to flange 48 as indicated by the numeral 140 in FIGS. 10 and 11 and which serves a purpose to be described more fully hereinafter.

Further in a manner similar to that shown in FIGS. 1–6, gear selector components 12 and 16 are of sheet metal construction having corresponding plate portions 52 and 62, respectively, pivotally interconnected with one another by means of a pin 64 which, in the present embodiment, is supported on plate portion 62 by means of a sleeve 142 extending through plate portion 62 and having a flange 144 facially engaging the inner side of plate portion 62. This sleeve arrangement advantageously enables welding the sleeve on both the inner and outer sides of plate portion 62 to optimize structural integrity of the pivotal support of plate member 62 on plate member 52. Plate member 52 has flanges 54 and 56 which, while of slightly different contour between the upper and lower ends of plate portion 52 with respect to the corresponding flanges in the embodiment shown in FIGS. 1–6, serve the same general purpose as the latter and have upper and lower ends numerically corresponding to those shown in FIGS. 1–6.

In the present embodiment, gear selector component 12 as defined by plate portion 52 and flanges 54 and 56 is longitudinally narrower than the spacing between wall portions 44c and 46c of upper portion 28 of support 10, and selector component 12 is pivotally mounted on upper portion 28 by means of a sleeve 146 and pin 148. More particularly in this respect, sleeve 146 extends through openings therefor in flanges 54 and 56, and pin 148 extends through the sleeve and through openings therefor in wall portions 44c and 46c of support portion 28. One end of sleeve 146 is radially enlarged to provide a spacing collar 150, and the sleeve is fastened to walls 54 and 56 by means of a weldment 152 between the sleeve and wall 56 so as to generally centrally support selector component 12 longitudinally between walls 44c and 46c. This pin and sleeve mounting arrangement for selector component 12 facilitates the assembly procedure and reduced production cost by eliminating the need for flanged openings in flanges 54 and 56 to support the pivot pin as in the embodiment illustrated in FIGS. 1–6. Further, the spacing of flanges 54 and 56 from wall portions 44c and 46c eliminates alignment problems with respect to the pivot pin openings, and avoids interengagement between the flanges and wall portions and thus assures against any interference therebetween during pivotal movement of the selector components relative to the support. The latter is achieved together with stability with respect to the pivotal support relative, for example, to that which would be achieved through use of the pin connection shown in the embodiment of FIGS. 1–6 with sufficient clearance to assure avoiding interference between the flanges of the selector plate and wall portions of the support.

As in the embodiment illustrated in FIGS. 1–6, plate portion 52 is provided with an arcuate slot 60, and plate portions 52 and 62 are interengaged by pin, ring and stop member components 74, 75 and 76, respectively, in the manner and for the purpose described in connection with the latter embodiment. Likewise, lower end 62a of plate portion 62 is pivotally interconnected with gearshift actuator member 132 of actuator assembly 22 to provide for reciprocation of member 132 in response to pivotal movement of gearshift selector 16 about axis 18 relative to gearshift selector component 12.

Figure 11:
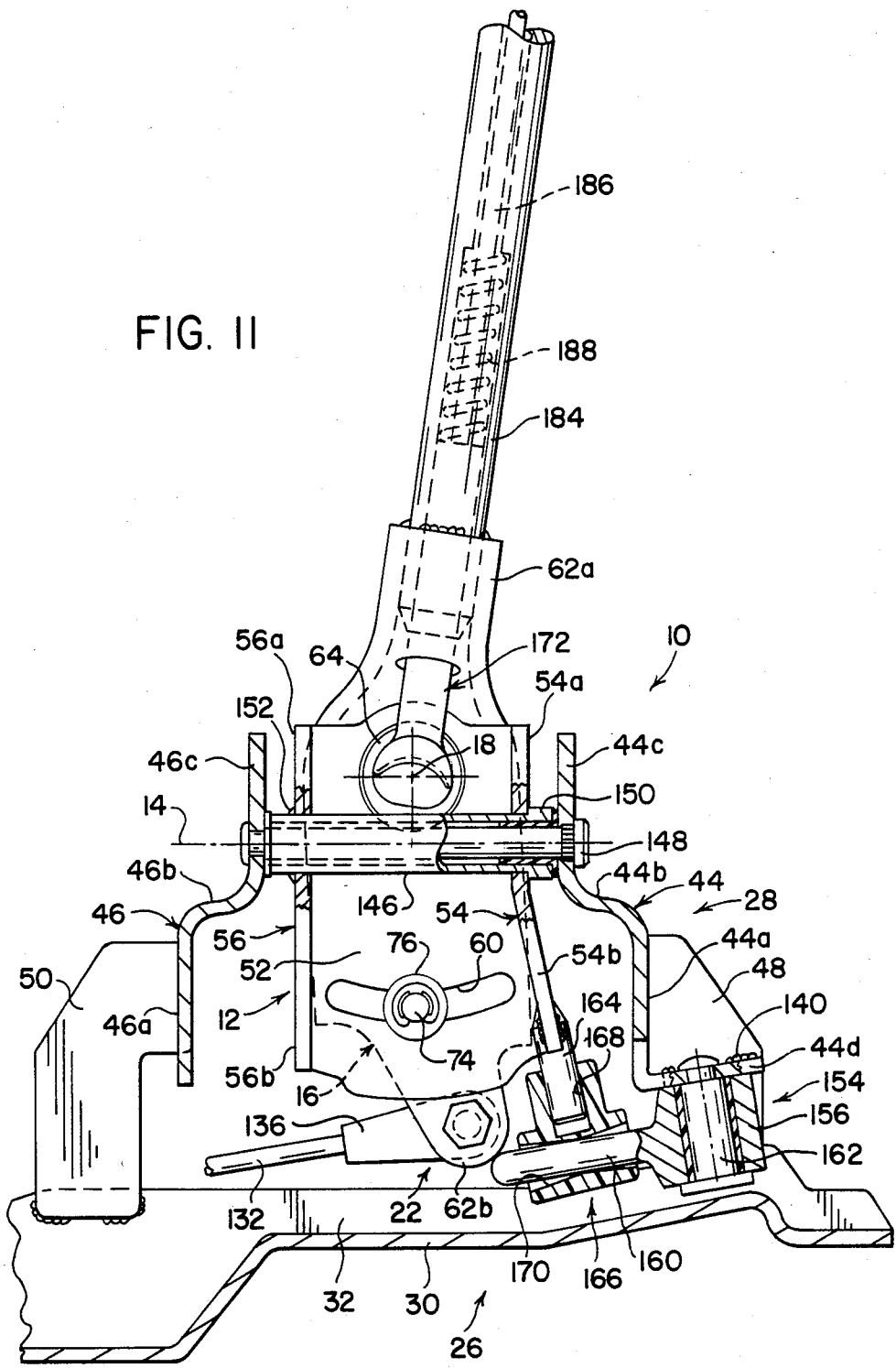
FIG. 11 is a sectional elevation view of the mechanism as seen along line 11—11 in FIG. 8.

An important modification in connection with the embodiment illustrated in FIGS. 7–13 resides in the linkage assembly by which pivotal movement of gear selector component 12 about axis 14 is translated into reciprocating displacement of gearshift actuator assembly 20. More particularly in this respect, the linkage assembly includes an L-shaped lever 154 having an apertured hub portion 156, a leg 158 extending laterally outwardly from hub portion 156, and a circular leg 160 extending rearwardly from hub portion 156. Leg 158 includes a reinforcing fillet 150a merging with hub portion 156, and the lever is preferably cast from sintered iron powder for the reasons set forth hereinafter. In the present embodiment, lever 154 is mounted on wall portion 44d of upper support portion 28 by means of a pin 162 which extends through hub portion 156 and is staked on wall portion 44d, whereby the lever is pivotal about an upwardly extending axis between legs 158 and 160. The linkage assembly further includes a circular post 164 welded or otherwise secured to lower end 54b of flange 54 of gear selector plate 52, and an inverted T-shaped coupling component 166 of suitable plastic material interconnecting post 164 and leg 160 of lever 154. More particularly in this respect, as best seen in FIG. 11, post 164 depends from flange portion 54b and is received in an elongate circular opening 168 provided therefor in the upwardly extending leg of coupling 166 by which the coupling is vertically slidable and rotatable relative to post 164. Circular leg 160 of lever 154 extends longitudinally through an opening 170 in the elongate lower end of coupling 166, whereby leg 160 is slidably and pivotally displaceable relative to the coupling component. Accordingly, it will be appreciated from FIGS. 8 and 11 of the drawing that pivotal displacement of gear selector plate 52 in opposite directions about axis 14 is translated through coupling component 166 and lever 156 into reciprocating movement of gearshift actuator assembly 120 in longitudinally opposite directions relative to lower support portion 26.

Importantly in connection with the linkage assembly in the present embodiment, the mounting of lever 154 on wall portion 44b of the upper support portion 28 advantageously eliminates tolerance problems encountered in connection with assembly of the gearshift mechanism with the lever mounted on the lower portion of the support assembly as in the embodiment illustrated in FIGS. 1–6. In this respect, the extent of pivotal displacement of the lever and the pivotal disposition thereof in the various gear selector positions of selector plate 52 is of utmost importance in connection with achieving shifting of the transmission gears. During assembly of the gearshift mechanism with the motion translating lever mounted on the lower portion of the support assembly, such pivotal displacement and positioning of the lever in the assembled gearshift mechanism requires close control of tolerances with respect to the mounting of gear selector plate 52 on the upper portion of the support, the mounting of the lever on the lower portion of the support, and the assembly of the upper and lower portions of the support by welding. Tolerances with respect to the latter assembly are most difficult to maintain in light of the requirements for positioning and holding the two support portions in a suitable fixture, and metal warpage resulting from the welding operation. By mounting the lever on the upper portion of the support in accordance with the present embodiment, all of the motion translating components are on the upper portion of the support, whereby tolerance requirements with regard to mounting of the lever on the lower portion of the support and the assembly of the upper and lower support portions are eliminated. Since the accuracy with respect to achieving desired positional relationships between gear selector plate and lever 154 is dependent on the accuracy with respect to machining openings in upper support portion 28 for the pivotal mounting of the two components, it will be appreciated that it is easier to obtain and to consistently maintain the necessary tolerances for achieving the desired positional relationships. Furthermore, it will be appreciated that less time and care is required to position and weld the upper and lower support portions. Accordingly, this lever mounting arrangement provides for a considerable reduction in production time and thus cost, while considerably improving reliability with respect to achieving desired displacement characteristics with respect to the gearshift actuator assembly.

Further in connection with important features of the linkage assembly in the embodiment illustrated in FIGS. 7–13, and which features could be incorporated in the embodiment of FIGS. 1–6, the T-shaped configuration of coupling component 166 in providing the elongate opening 170 for leg 160 of lever 154 promotes stability with respect to feel for the driver of the vehicle in connection with the gearshifting operations and, further, minimizes wearing interengagement between the component parts so as to promote a longer life therefor. Moreover, as in the embodiment illustrated in FIGS. 1–6, it will be appreciated that the structural location of lever 154 in close proximity to flange portion 54b of gear selector plate 52 with the circular lever leg extending under the post depending from flange portion 54b promotes compactness, minimizes free play and enhances stability with respect to feel in connection with pivotal movements of the gear selector plate. With regard to the preferred casting of lever 54 from sintered iron powder, as mentioned hereinabove, such casting of the lever is of considerable advantage in connection with the connecting of gearshift actuator assembly 20 with the lever. In this respect, actuating member 106 of assembly 20 is pivotally interconnected with lever 154 by means of a socket member 118 on the inner end of member 106 and a ball pin 120 staked on the outer end of leg 158 of the lever. Socket member 118 is forceably interengaged with ball pin 120 by pushing the socket member downwardly onto the pin. Such interengagement requires the application of considerable downward force and, for this reason together with facilitating the forming of circular leg 160, the cast forming of the lever is preferred. More particularly in this respect, the cast iron powder provides the necessary strength in leg 158 to accommodate the downward assembly force with less axial thickness of the leg than would be required with a sheet metal lever member. Further, the cast lever has better wear characteristics and avoids machining or other time consuming and costly forming operations with respect to providing circular leg 160.

Further modifications of importance in connection with the embodiment illustrated in FIGS. 7–13 reside in the structures of the operating lever assembly 24 and the reverse lockout arrangement. More particularly in this respect, lever assembly 24 supports a vertically reciprocable lockout member 172 having a lower end 174 which is of generally circular contour relative to the direction of axis 18 and has a planar surface 176 facially engaging inner surface 64a of pivot pin 64. Lower end 174 of the lockout member further includes an outer abutment surface 178 which, upon pivotal movement of gear selector components 12 and 16 counterclockwise about axis 14 in FIG. 8, is adapted to abut against a circular stop pin 180 to limit displacement of the selector components into the reverse positions thereof. Stop pin 180 is staked or otherwise secured to the upper end portion 42c of wall 42 of the support assembly, generally in alignment with pivot axis 18. Accordingly, it will be appreciated that when selector components 12 and 16 are pivoted counterclockwise in FIG. 8 for face 178 of the lockout member to engage the stop pin, and which position corresponds to the first and second gear positions for selector component 12, the selector components are stabilized in such positions and during pivotal movement of gear selector component 16 in opposite directions about axis 18 and into the corresponding one of the first and second gear positions.

Lower end 174 of the lockout member further includes a recess 182 beneath abutment surface 178, and when the lockout member is displaced upwardly to the position shown in FIG. 9, abutment surface 178 is elevated above stop pin 180, and recess 182 permits the gear selector plates to pivot further in the counterclockwise direction and into the reverse positions therefor. Such further pivotal movement is limited by engagement of upper ends 54c and 56c of flanges 54 and 56 with the upper end of wall portion 46c on longitudinally opposite sides of stop pin 180. The use of stop pin 180 advantageously avoids having to contour the upper edge of wall portion 42c to provide an arcuate stop tab as in the embodiment illustrated in FIGS. 1–6 and, further, facilitates the provision of a smooth surface for facial engagement with abutment surface 178 so as to minimize friction and thus wearing away of surface 178 as a result of pivotal movement of gear selector component 16 between the first and second gear positions thereof.

Figure 12:
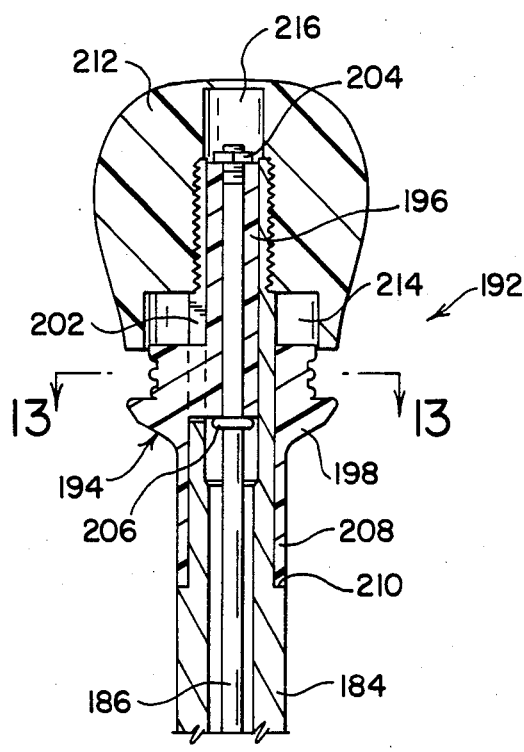
FIG. 12 is a cross-sectional elevation view of the lockout actuator assembly as seen along line 12—12 in FIG. 7.
Figure 13:
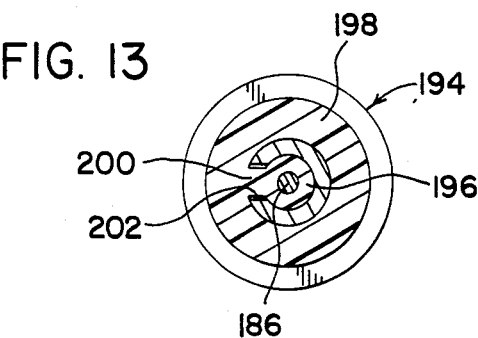
FIG. 13 is a plan view, in section, taken along line 13—13 in FIG. 12.

Operating lever assembly 24 includes a tubular body 184 secured to upper end 62a of gear selector plate 62 such as by welding. Displacement of lockout member 172 between the locking and released positions thereof is achieved by means of a vertically displaceable operating rod 186 extending through tubular body 184 and the lower end of which rod is secured to the upper end of lockout member 172 such as by a threaded or knurled interengagement therebetween. Lockout member 172 is biased downwardly into its locking position by means of a coil spring 188 between the upper end of the lockout member and a shoulder 190 in the lower end of body portion 184, and is displaced upwardly against such bias by means of an actuating handle assembly 192 at the upper end of tubular body 184. As best seen in FIGS. 12 and 13 of the drawing, handle assembly 192 includes an annular actuating member 194 reciprocably supported on the upper end of tubular body 184. More particularly in this respect, actuating member 194 includes a stem portion 196 slidably received in tubular body 184 and a sleeve portion 198 surrounding the tubular body and integrally connected with stem portion 196 by means of a bridging portion 200 therebetween. Bridging portion 200 extends radially through a guide slot 202 extending longitudinally of tubular body 78 from the upper end thereof, and the bridging portion engages the slot to prevent rotation of actuating member 194 relative to the tubular body.

Stem 196 is centrally apertured to receive the upper end of rod 186, and the latter end of the rod is threaded to receive a lock nut or the like 204 which is cooperable with a stop collar 206 on rod 186 to interengage the rod and actuating member 194 for displacement together. Spring 188 biases rod 186 and thus actuating member 194 downwardly relative to tubular body 184, and sleeve portion 198 includes an annular skirt 208 having a lower end adapted to abut against circumferential shoulder 210 on the tubular body so as to limit downward displacement of rod 186 and, thus, position lockout member 172 in its locking position shown in FIG. 8. The upper end of tubular body 184 is externally threaded to receive an internally threaded knob 212 which is provided at its lower end with a recess 214 of sufficient diameter to enable displacement of the upper end of sleeve portion 198 thereinto. Further, knob 212 is provided at its upper end with a recess 216 of a diameter and axial length to enable displacement of stem portion 196 and rod 186 upwardly thereinto to achieve displacement of lockout member 172 to the released position thereof shown in FIG. 9. Accordingly, it will be appreciated that upward displacement of actuating member 194 relative to knob 212 displaces the lockout member from the locked to the released position thereof against the bias of spring 188 and that, upon release of actuating member 194, spring 188 biases the lockout member back to its locked position. Preferably, recess 214 in knob 212 is of an axial depth which provides for the upper end of sleeve portion 198 to engage the bottom of the recess so as to positively stop the lockout member in its released position, thus to give the operator a better feel in connection with achieving release of the selector components for displacement into the reverse positions thereof.

It will be understood with regard to the embodiment illustrated in FIGS. 7-13 that linear displacements of the gearshift actuator members 106 and 132 into positions for achieving transmission gear shifting between the reverse and five forward speed gears is achieved by pivoting gear selector components 12 and 16 in the same manner and with the same directional displacements of the selector plates as described hereinabove in connection with the embodiment shown in FIGS. 1-6.

While it is preferred to provide for the pivotal displacements of selector plate 52 about axis 14 to be translated into reciprocating displacement of gearshift actuator assembly 20 through the use of an L-shaped lever or bellcrank either mounted on the lower or upper portion of the support assembly as described in connection with the preferred embodiments, it will be appreciated that other motion translating arrangements can be provided for the latter purpose without sacrificing the advantages of structural compactness as well as close proximity between the selector plate and the driven end of the gearshift actuator assembly. Several such other motion translating arrangements are somewhat schematically illustrated in FIGS. 14-18 wherein the numeral 220 represents a circular post corresponding to the posts 124 and 164 in the embodiments described above, and wherein numeral 222 represents a ball pin component corresponding to ball pin 120 in the latter embodiments. With further regard to FIGS. 14-18, the directions of arrows A correspond to the lateral pivotal movement of selector plate 52 in opposite directions about axis 14, and the directions of arrows B correspond to the longitudinal direction of displacement of gearshift actuator member 106.

Briefly with reference to FIGS. 14-18, the motion translating arrangement in FIG. 14 includes a coupling 224 on the lower end of post 220 connected to one end of a flexible ball-type chain 226 which extends through a rigid guide tube 228 and has its opposite end connected to a carrier 230 supporting ball pin 222. Guide tube 228 is suitably secured to the support assembly and provides a 90° bend, whereby it will be appreciated that displacement of post 220 in the directions of arrow A provides for reciprocating movement of ball pin 222 and thus a gearshift actuating member attached thereto in the directions of arrow B.

FIG. 15 illustrates a rack and pinion arrangement including a rack member 232 rigidly mounted on post 220 and a pinion member 234 rotatably mounted on the support assembly by means of a pin 236. Pinion 234 carries ball pin 222 thereon at a point radially and laterally outwardly of pin 236, whereby displacement of post 220 in the opposite directions of arrow A imparts displacement to ball pin 222 in the opposite directions of arrow B.

In FIG. 16, post 220 is provided with a laterally extending plate member having a cam slot 238 receiving an upwardly extending pin 240 on one end of a longitudinally extending slide plate 242. Slide plate 242 extends through a guide member 244 secured to the support assembly and is provided on its opposite end with a ball pin 222. Slot 238 and pin 240 slidably interengage in response to displacement of post 220 in the directions of arrow A to displace slide 242 and thus ball pin 222 in the directions of arrow B.

In the arrangement illustrated in FIG. 17, a rigid guide track 246 is suitably secured to the support assembly and provides a 90° turn supporting a train of links 248 pivotally interconnected with one another and slidably supported on track 246 by corresponding coupling elements 250. The link at one end is pivotally connected to a coupling member 252 on post 220, and the link at the other end is pivotally connected to a carrier 254 on which a ball pin 222 is mounted, and both of which coupling member 252 and carrier 254 are slotted for guidance by track 246. Accordingly, displacement of post 220 in the opposite directions of arrow A imparts reciprocating displacement to pin 222 in the directions of arrow B.

FIG. 18 illustrates a bellcrank arrangement wherein a bellcrank lever 256 is pivotally mounted on post 220 for displacement therewith and relative thereto about the post axis. Lever 256 includes a longitudinally extending leg 258 and a laterally extending leg 260 which carries a ball pin 222. The outer end of leg 258 is disposed between a pair of laterally spaced apart and fixed stop members suitably mounted on the support assembly. Accordingly, it will be appreciated that displacement of post 220 in the opposite directions of arrow A causes leg 258 of the lever to engage one or the other of the stops 262, whereby the lever pivots relative to post 220 to displace ball pin 222 in the opposite directions of arrow B.

While considerable emphasis has been placed herein on the specific structures and structural interrelationships between the component parts of the preferred embodiments, it will be appreciated that many embodiments of the invention can be made and that many changes can be made in the embodiments herein illustrated and described without departing from the principals of the present invention. Accordingly, it is to be distinctly understood that the foregoing descriptive matter is to be interpreted merely as illustrative of the prevent invention and not as a limitation.

Having thus described the invention, it is claimed:

1. In a manually operable gear shifting mechanism for displacing a pair of transmission gear actuators and comprising support means having upper and lower ends, first and second gear selector means mounted on said support means for pivotal movement together about a first axis between said upper and lower ends and for pivotal movement of said second selector means relative to said first selector means about a second axis perpendicular to said first axis, means to translate pivotal movement of said first and second selector means about said first axis to reciprocating movement of one of said gear actuators, means to translate pivotal movement of said second selector means about said second axis to reciprocating movement of the other of said actuators, and lockout means to releaseably limit pivotal displacement of said first and second gear selector means in one direction about said first axis, the improvement comprising, said support means including stop means above said first axis, said lockout means including lockout member means pivotal with said first and second selector means about said first axis and displaceable between locking and released positions, said lockout member means in said locking position engaging said stop means in response to pivotal movement of said first and second selector means in said one direction, and means to selectively displace said lockout member means from said locking to said released position in which said lockout member means is disengaged from said stop means to permit further movement of said first and second selector means in said one direction.

2. The improvement according to claim 1, wherein said stop means is wall means on said support means.

3. The improvement according to claim 1, wherein said stop means is a stop pin mounted on said support means.

4. The improvement according to claim 1, and means including pivot pin means mounting said second gear selector means on said first gear selector means and providing said second axis, said pin means having an end facing said stop means, and said lockout member means in said locking position being interposed between said stop means and said end of said pin means.

5. The improvement according to claim 4, wherein said lockout member mcans in said locking position facially engages said end of said pin means.

6. The improvement according to claim 1, wherein said second axis is above said first axis.

7. The improvement according to claim 6, and means including pivot pin means mounting said second gear selector means on said first gear selector means and providing said second axis, said pin means having an end facing said stop means, and said lockout member means in said locking position being interposed between said stop means and said end of said pin means.

8. The improvement according to claim 7, wherein said lockout member means in said locking position facially engages said end of said pin means.

9. The improvement according to claim 8, wherein said stop means is wall means on said support means.

10. The improvement according to claim 8, wherein said stop means is a stop pin mounted on said support means.

11. The improvement according to claim 1, wherein said means for selectively displacing said lockout member means between said locking and released positions includes operating lever means interconnected with said second gear selector means and extending upwardly from said upper end of said support means, means supporting said lockout member means for reciprocation relative to said lever means, said lever means having an upper end, means at said upper end of said lever means for selectively reciprocating said lockout member means from said locking to said released position, and means biasing said lockout member means from said released toward said locking position.

12. The improvement according to claim 11, wherein said lever means has a lower end and is hollow between said upper and lower ends thereof, said means supporting said lockout member means including operating rod means in said lever means and having corresponding upper and lower ends, said lockout member means being connected to said lower end of said operating rod means, and means connected to the upper end of said rod means and reciprocable relative to said lever means to provide said means for reciprocating said lockout lever means.

13. The improvement according to claim 12, wherein said second axis is above said first axis, and means including pivot pin means mounting said second gear selector means on said first gear selector means and providing said second axis, said pin means having an end facing said stop means, and said lockout member means in said locking position being interposed between said stop means and said end of said pin means.

14. The improvement according to claim 13, wherein said means biasing said lockout member means includes spring means in said lever means biasing said lockout member means downwardly relative to said lever means.

15. The improvement according to claim 14, wherein said upper end of said lever means is longitudinally slotted and said means connected to said upper end of said rod means includes actuating member means, said actuating member means including an inner portion in said lever means, an annular portion surrounding said lever means, and a bridging portion between said inner and outer portions and extending through said slotted upper end of said lever means, said upper end of said rod means being connected to said inner portion of said actuating member means.

16. In a manually operable gearshifting mechanism for displacing a pair of transmission gear actuators and comprising support means having upper and lower ends, first and second gear selector means mounted on said support means for pivotal movement together about a first axis between said upper and lower ends and for pivotal movement of said second selector means relative to said first selector means about a second axis perpendicular to said first axis, means to translate pivotal movement of said first selector means about said first axis to reciprocating movement of one of said gear actuators, and means to translate pivotal movement of said second selector means about said second axis to reciprocating movement of the other of said actuators, the improvement comprising: said means to translate pivotal movement of said first gear selector means including flange means on said first gear selector means transverse to said first axis and having lower end means below said first axis, means providing circular post means extending downwardly from said lower end means of said flange means, lever means having first and second legs, means mounting said lever means on said support means for pivotal movement about an upwardly extending lever axis between said first and second legs and radially spaced from said post means, one of said legs of said lever means extending in the direction from said lever axis toward said post means and including a circular leg portion, coupling member means slidably and rotatably receiving each said post means and said circular leg portion, whereby pivotal displacement of said first gear selector means about said first axis displaces said lever means about said lever axis, and means connecting the other of said legs of said lever means to said one gear actuator.

17. The improvement according to claim 16, wherein said post means has a lower end and said circular leg portion of said one leg of said lever means extends beneath said lower end of said post means.

18. The improvement according to claim 17, wherein said coupling member means includes an upwardly extending portion including an elongate opening receiving said post means, and a lower portion extending in laterally opposite directions from said upwardly extending portions and including an elongate opening through which said circular leg portion extends.

19. The improvement according to claim 16, wherein said upper end of said support means includes wall means transverse to said first axis and supporting said first gear selector means for pivotal movement about said first axis, said wall means including an integral wall portion spaced below said first axis and extending transverse to said lever axis, and pin means mounting said lever means on said wall portion.

20. The improvement according to claim 16, wherein said lower end means of said flange means includes means engaging against said support means to limit pivotal movement of said first gear selector means in one direction about said first axis.

21. The improvement according to claim 20, wherein said flange means includes upper end means above said first axis for engaging against said support means to limit pivotal movement of said first gear selector means in the direction opposite said one direction.

22. The improvement according to claim 16, wherein said flange means includes upper end means above said first axis, said upper end of said support means including stop means transverse to said flange means and laterally spaced from said first axis, lockout member means supported adjacent said upper end means of said flange means for pivotal displacement with said first gear selector means about said first axis, said stop member means having a locking position engaging said stop means to limit pivotal displacement of said first gear selector means in one direction about said first axis, and means to selectively displace said lockout member means relative to said flange means from said locking to a released position to release said first gear selector means for further displacement in said one direction, and said upper end means of said flange means engaging said stop means to limit said further displacement.

23. The improvement according to claim 22, wherein said lower end means of said flange means includes means engaging against said support means to limit pivotal displacement of said first gear selector means in the direction opposite said one direction.

24. The improvement according to claim 23, and means including pivot pin means mounting said second gear selector means on said first gear selector means and providing said second axis, said pin means having an end facing said stop means, and said lockout member means in said locking position being interposed between said stop means and said one of said pin means.

25. The improvement according to claim 24, wherein said means for selectively displacing said lockout member means between said locking and released positions includes operating lever means interconnected with said second gear selector means and extending upwardly from said upper end of said support means, means supporting said lockout member means for reciprocation relative to said lever means, said lever means having an upper end, means at said upper end of said lever means for selectively reciprocating said lockout member means from said locking to said released position, and means biasing said lockout member means from said released toward said locking position.

26. In a manually operable gearshifting mechanism for displacing a pair of transmission gear actuators and comprising support means having upper and lower ends, first and second gear selector means mounted on said support means for pivotal movement together about a first axis and for pivotal movement of said second selector means relative to said first selector means about a second axis perpendicular to said first axis, means to translate pivotal movement of said first selector means about said first axis to reciprocating movement of one of said gear actuators, and means to translate pivotal movement of said second selector means about said second axis to reciprocating movement of the other of said actuators, the improvement comprising: said first gear selector means including first plate means, said second gear selector means including second plate means parallel to and adjacent said first plate means, first means pivotally interconnecting said first and second plate means and providing said second axis, whereby said second plate means is pivotal about said second axis parallel to said first plate means, and second means separate from and laterally spaced from said first means and interengaging said first and second plate means against relative lateral displacement.

27. The improvement according to claim 26, and means interengaging said first plate means and said second plate means to limit the extent of pivotal movement of said second plate means relative to said first plate means.

28. The improvement according to claim 26, wherein said second means interengaging said first and second plate means against relative lateral displacement includes pin means mounted on said second plate means for pivotal movement therewith about said second axis, an arcuate slot in said first plate means, said pin means having an end extending through said slot, and means on said end of said pin means laterally engaging against said first plate means.

29. The improvement according to claim 28, and flange means on said first plate means adjacent the opposite ends of said arcuate slot, said means on said end of said pin being bumper means engaging said flange means to limit the extent of pivotal movement of said second plate means relative to said first plate means.

30. The improvement according to claim 29, wherein said flange means are transverse to said first axis and have upper and lower laterally outer ends respectively above and below said first axis, said laterally outer ends engaging said support means to limit pivotal displacement of said first and second gear selector means in opposite directions about said first axis.

31. The improvement according to claim 30, and lockout member means between said flange means and above said first axis, said upper end of said support means including stop means, said lockout member means having a locking position in which said lockout member means engages said stop means in response to pivotal movement of said first and second gear selector means in one of said directions and before said upper laterally outer ends of said flange means engage said support means in response to said pivotal movement in said one direction, and means to selectively displace said lockout member means from said locking to a released position releasing said first and second gear selector means for further pivotal displacement in said one direction for said upper laterally outer ends of said flange means to engage said support means.

32. The improvement according to claim 26, and flange means on said first plate means extending transverse to said first axis, said flange means having upper and lower laterally outer ends respectively above and below said first axis, and said laterally outer ends engaging said support means to limit pivotal displacement of said first and second gear selector means in opposite directions about said first axis.

33. The improvement according to claim 32, and lockout member means between said flange means and above said first axis, said upper end of said support means including stop means, said lockout member means having a locking position in which said lockout member means engages said stop means in response to pivotal movement of said first and second gear selector means in one of said directions and before said upper laterally outer ends of said flange means engage said support means in response to said pivotal movement in said one direction, and means to selectively displace said lockout member means from said locking to a released position releasing said first and second gear selector means for further pivotal displacement in said one direction for said upper laterally outer ends of said flange means to engage said support means.

34. The improvement according to claim 26, wherein said second axis is above said first axis, said upper end of said support means including stop means spaced from and facing said first plate means in the direction of said second axis, lockout member means having a locking position in which said lockout member means is interposed between said first plate means and said stop means, whereby pivotal displacement of said first and second gear selector means in one direction about said first axis is limited by engagement of said lockout member means with said stop means, and means for selectively displacing said lockout member means from said locking to a released position disengaging said stop means and releasing said first and second gear selector means for further pivotal displacement in said one direction.

35. The improvement according to claim 34, wherein said first means pivotally interconnecting said first and second plate means and providing said second axis includes pivot pin means having an end facially engaging said lockout member means when the latter is in said locking position.

36. The improvement according to claim 35, wherein said means for selectively displacing said lockout member means between said locking and released positions includes operating lever means interconnected with said second gear selector means and extending upwardly from said upper end of said support means, means supporting said lockout member means for reciprocation relative to said lever means, said lever means having an upper end, means at said upper end of said lever means for selectively reciprocating said lockout member means from said locking to said released position, and means biasing said lockout member means from said released toward said locking position.

37. The improvement according to claim 36, wherein said second means interengaging said first and second plate means against relative lateral displacement includes pin means mounted on said second plate means for pivotal movement therewith about said second axis, an arcuate slot in said first plate means, said pin means having an end extending through said slot, and means on said end of said pin engaging against said first plate means.

38. The improvement according to claim 37, and flange means on said first plate means adjacent the opposite ends of said arcuate slot, said means on said end of said pin being bumper means engaging said flange means to limit the extent of pivotal movement of said second plate means relative to said first plate means.

39. The improvement according to claim 38, wherein said flange means are transverse to said first axis and have upper and lower laterally outer ends respectively above and below said first axis, said upper ends engaging said support means upon release of said first and second gear selector means for said further displacement in said one direction, and said lower ends of said flange means engaging said support means to limit pivotal displacement of said first and second gear selector means about said first axis in the direction opposite said one direction.

40. The improvement according to claim 39, wherein said first means pivotally interconnecting said first and second plate means further includes sleeve means extending through an opening therefor in said second plate means and having radially outwardly extending flange means between said first and second plate means, said sleeve means being secured to said second plate means, said pivot pin means extending through an opening therefor in said first plate means and through said sleeve means, and said pivot pin means having head means engaging against said first plate means and providing said end facially engaging said lockout member means.

41. The improvement according to claim 26, wherein said first means pivotally interconnecting said first and second plate means includes sleeve means extending through an opening therefor in said second plate means and having radially outwardly extending flange means between said first and second plate means, said sleeve means being secured to said second plate means, and pivot pin means extending through an opening therefor in said first plate means and through said sleeve means, and said pivot pin means having head means engaging against said first plate means.

42. The improvement according to claim 41, wherein said second means interengaging said first and second plate means against relative lateral displacement includes pin means mounted on said second plate means for pivotal movement therewith about said second axis, an arcuate slot in said first plate means, said pin means having an end extending through said slot, and means on said end of said pin engaging against said first plate means.

43. The improvement according to claim 42, and flange means on said first plate means adjacent the opposite ends of said arcuate slot, said means on said end of said pin being bumper means engaging said flange means to limit the extent of pivotal movement of said second plate means relative to said first plate means.

44. The improvement according to claim 43, wherein said second axis is above said first axis, said upper end of said support means including stop means spaced from and facing said head means of said pivot pin means, lockout member means having a locking position in which said lockout member means is interposed between said head means and said stop means, whereby pivotal displacement of said first and second gear selector means in one direction about said first axis is limited by engagement of said lockout member means with said stop means, and means for selectively displacing said lockout member means from said locking to a released position disengaging said stop means and releasing said first and second gear selector means for further pivotal displacement in said one direction.

45. The improvement according to claim 44, wherein said means for selectively displacing said lockout member means between said locking and released positions includes operating lever means interconnected with said second gear selector means and extending upwardly from said upper end of said support means, means supporting said lockout member means for reciprocation relative to said lever means, said lever means having an upper end, means at said upper end of said lever means for selectively reciprocating said lockout member means from said locking to said released position, and means biasing said lockout member means from said released toward said locking position.

46. A manually operable gearshift mechanism comprising support means having longitudinally extending bottom wall means, side wall means extending upwardly from said bottom wall means and longitudinally spaced apart end wall means extending laterally from said side wall means, a first gear selector component including a first plate and longitudinally spaced apart flanges extending from one side thereof perpendicular thereto and disposed between said end wall means, means pivotally interconnecting said flanges and said end wall means to support said first gear selector component for pivotal movement about a first pivot axis extending longitudinally of said support means, a second gear selector component including a second plate parallel to and laterally adjacent the other side of said first plate, pivot pin means mounting said second plate on said first plate for pivotal movement relative thereto about a second axis perpendicular to and above said first axis, said second plate including an upper end above said second axis, operating lever means connected to and extending upwardly from said upper end of said second plate for pivoting said second plate relative to said first plate about said second axis and for pivoting said first and second plates together about said first axis, said side wall means of said support means having a portion facing said first plate in the direction of said second axis and provided with stop means, lockout member means supported by said operating lever means for reciprocation between locking and released positions, said lockout member means in said locking position engaging said stop means to limit pivotal displacement of said first and second plates in one direction about said first axis and in said released position being disengaged with said stop means to release said first and second plates for further displacement in said one direction, means supported by said operating lever means for displacing said lockout member means between said locking and released positions, said first and second plates having lower ends spaced below said first axis, first and second longitudinally reciprocable gearshift actuator components adjacent said bottom wall means of said support means, means interconnecting said lower end of said first plate with said first actuator component for translating pivotal movement of said first and second plates about said first axis to reciprocating movement of said first actuator component, means interconnecting the lower end of said second plate with said second actuator component for translating pivotal movement of said second plate relative to said first plate about said second axis to reciprocating movement of said second actuator component, and means between said first axis and said lower ends of said first and second plates interengaging said first and second plates against relative lateral displacement during pivotal movements thereof about said first and second axes.

47. The gearshift mechanism according to claim 46, wherein said operating lever means includes a tubular body having a lower end connected to said upper end of said second plate and having an upper end, rod means in said tubular body and having lower and upper ends, said lockout member means being connected to said lower end of said rod means, said means for displacing said lockout member means between said locking and released positions including means reciprocably supported on said tubular body at said upper end thereof and connected to said upper end of said rod means for displacing said lockout member means from said locking to said released position, and spring means in said tubular body biasing said lockout member means from said released to said locking position.

48. The gearshift mechanism according to claim 46, wherein said flanges on said first plate having upper and lower laterally outer ends respectively above and below said first axis, said upper ends of said flanges engaging said side wall means of said support means when said lockout member means is in said released position to limit said further displacement of said first and second plates in said one direction, and said lower ends of said flanges engaging said side wall means to limit pivotal displacement of said first and second plates about said first axis in the direction opposite said one direction.

49. The gearshift mechanism according to claim 46, wherein one of said flanges on said first plate has a lower end corresponding to said lower end of said first plate and said means interconnecting said lower end of said first plate with said first actuator component includes a circular post on and extending downwardly from said lower end of said one flange, a bellcrank lever mounted on said support means for pivotal displacement about an upwardly extending lever axis radially offset longitudinally from said post, said bellcrank lever including a first leg extending radially of said lever axis toward first post and having a circular portion extending beneath said post and a second leg extending radially from said post and laterally of said support means and having an outer end interconrrected with said first actuator component, and a coupling member having an upwardly extending opening slidably and rotatably receiving said post and having a longitudinally extending opening slidable and rotatably receiving said circular portion of said first leg.

50. The gearshift mechanism according to claim 49, wherein said bellcrank lever is pivotally mounted on said bottom wall means of said support means.

51. The gearshift mechanism according to claim 49, wherein said end wall means of said support means includes an end wall adjacent said one flange, said end wall including a portion extending longitudinally of said support means and spaced above said bottom wall means, and said bellcrank lever being pivotally mounted on said wall portion.

52. The gearshift mechanism according to claim 51, wherein said bottom wall means of said support means is a stamped sheet metal member, and said side and end wall means of said support means is a separate stamped sheet metal member, and means rigidly fastening said separate sheet metal members together.

53. The gearshift mechanism according to claim 46, wherein said means interengaging said first and second plates against relative lateral displacement includes means to limit the extent of pivotal displacement of said second plate about said second axis.

54. The gearshift mechanism according to claim 53, wherein said means interengaging said iirst and second plates includes a pin mounted on said second plate for displacement therewith, an arcuate slot in said first plate in the direction between said flanges, said pin extending through said slot, means providing a spacer ring about said pin and between said first and second plates, and a bumper member on said pin engaging said flanges to limit pivotal displacement of said second plate in opposite directions about said second axis.

55. The gearshift mechanism according to claim 54, wherein said operating lever means includes a tubular body having a lower end connected to said upper end of said second plate and having an improved rod means in said tubular body and having lower and upper ends, said lockout member means being connected to said lower end of said rod means, said means for displacing said lockout member means between said locking and released positions including means reciprocably supported on said tubular body at said upper end thereof and connected to said upper end of said rod means for displacing said lockout member means from said locking to said released position, and spring means in said tubular body biasing said lockout member means from said released to said locking position.

56. The gearshift mechanism according to claim 55, wherein said flanges on said first plate have upper and lower laterally outer ends respectively above and below said first axis, said upper ends of said flanges engaging said side wall means of said support means when said lockout member means is in said released position to limit said further displacement of said first and second plates in said one direction, and said lower ends of said flanges engaging said side wall means to limit pivotal displacement of said first and second plates about said first axis in the direction opposite said one direction.

57. The gearshift mechanism according to claim 56, wherein one of said flanges on said first plate has a lower end corresponding to said lower end of said first plate and said means interconnecting said lower end of said first plate with said first actuator component includes a circular post on and extending downwardly from said lower end of said one flange, a bellcrank lever mounted on said support means for pivotal displacement about an upwardly extending lever axis radially offset longitudinally from said post, said bellcrank lever including a first leg extending radially of said lever axis toward first post and having a circular portion extending beneath said post and a second leg extending radially from said post and laterally of said support means and having an outer end interconnected with said first actuator component, and a coupling member having an upwardly extending opening slidably and rotatably receiving said post and having a longitudinally extending opening slidable and rotatably receiving said circular portion of said first leg.

58. A manually operable gearshift mechanism comprising a lower sheet metal support member having longitudinally opposite ends and laterally spaced apart sides between said ends, an upper sheet metal support member having a side wall adjacent one of said sides of said lower support member, said side wall extending upwardly from said lower support member and having lower, intermediate and upper wall portions, said lower wall portion being rigidly secured to said one side of said lower support member, said upper support member further including longitudinally spaced apart end walls each integral with and extending laterally from said upper and intermediate wall portions of said side wall toward the other of said sides of said lower support member, each said end wall having longitudinally extending flange means integral therewith and rigidly secured to said other side of said lower support member, first gear selector means mounted between said end walls for pivotal movement about a first axis, said first selector means including longitudinally extending plate means and flange means extending laterally from said plate means in the direction toward said side wall, second gear selector means mounted on said plate means of said first gear selector means for pivotal movement relative thereto about a second axis, first and second gearshift actuator means supported on said lower support member for longitudinal reciprocation relative thereto, means interconnecting said first and second gear selector means respectively with said first and second actuator means for translating pivotal movements thereof abrout said first and second axes into reciprocating movements of said actuator means, said flange means of said first gear selector means including laterally outer ends above and below said first axis for engaging said side wall to limit pivotal displacement of said first gear selector means in opposite directions about said first axis.

59. The gearshift mechanism according to claim 58, wherein said intermediate wall portion of said side wall is inclined laterally inwardly from said one side of said lower support member and has an upper end, and said upper wall portion of said side wall extends generally vertically from said upper end, said laterally outer ends of said flange means above and below said first axis respectively engaging said upper wall portion and said intermediate wall portion of said side wall in response to said pivotal displacement of said first gear selector means.

60. The gearshift mechanism according to claim 58, wherein said plate means of said first gear selector means has opposite sides and longitudinally spaced apart end edges extending above and below said first axis, said flange means including flanges extending from one of said sides of said plate means along each said end edge thereof, means including pin means interconnecting said flanges and said end walls of said upper support member and providing said first axis, and said second gear selector means being pivotally mounted on said plate means on the other of said sides thereof.

61. The gearshift mechanism according to claim 60, wherein said intermediate wall portion of said side wall is inclined laterally inwardly from said one side of said lower support member and has an upper end, and said upper wall portion of said side wall extends generally vertically from said upper end, said laterally outer ends of said flange means above and below said first axis respectively engaging said upper wall portion and said intermediate wall portion of said side wall in response to said pivotal displacement of said first gear selector means.

62. The gearshift mechanism according to claim 61, and a lockout member between said flanges and above said first axis, means including said second gear selector means supporting said lockout member for vertical displacement between a locking position and a releasing position above said locking position, said upper wall portion of said side wall including stop means facing said lockout member, said lockout member in said locking position engaging said stop means in response to pivotal movement of said first gear selector means in the one of said opposite direction in which said laterally outer ends of said flange means above said first axis engage said upper wall portion of said side wall, and said lockout member in said released position disengaging said stop means to release said first gear selector means for further pivotal displacement in said one direction.

63. The gearshift mechanism according to claim 62, wherein said plate means of said first gear selector means is first plate means and said second gear selector means includes second plate means parallel to said first plate means, means including a pivot pin pivotally interconneting said first and second plate means and providing said second axis, pin means on said second plate means below said second axis and extending through a slot provided therefor in said first plate means, said slot extending in the direction between said flanges of said first plate means and said pin means having an end extending in the direction of said flanges and on said one side of said first plate means, and means on said pin means and cooperable with said pin means to restrain relative lateral displacement between said first and second plate means.

64. The gearshift mechanism according to claim 63, wherein said means on said pin means includes bumper means on said end of said pin means to engage said flanges of said first plate means to limit pivotal displacement of said second plate means relative to said first plate means in opposite directions about said second axis.

65. The gearshift mechanism according to claim 64, wherein said second axis is above said first axis, and said pivot pin providing said second axis includes an end on said one side of said first plate means, and said lockout member in said locking position being disposed between said end of said pivot pin and said stop means on said side wall and in facial engagement with said end of said pivot pin.

* * * * *